United States Patent
Al-Hallaj et al.

(10) Patent No.: US 10,164,301 B2
(45) Date of Patent: Dec. 25, 2018

(54) ENERGY STORAGE THERMAL MANAGEMENT SYSTEM USING MULTI-TEMPERATURE PHASE CHANGE MATERIALS

(75) Inventors: Said Al-Hallaj, Chicago, IL (US); Greg Albright, Chicago, IL (US)

(73) Assignee: All Cell Technologies, LLC, Chicago, IL (US)

(*) Notice: Subject to any disclaimer, the term of this patent is extended or adjusted under 35 U.S.C. 154(b) by 597 days.

(21) Appl. No.: 14/122,979

(22) PCT Filed: Jun. 7, 2012

(86) PCT No.: PCT/US2012/041361
§ 371 (c)(1),
(2), (4) Date: Nov. 27, 2013

(87) PCT Pub. No.: WO2012/170691
PCT Pub. Date: Dec. 13, 2012

(65) Prior Publication Data
US 2014/0079978 A1    Mar. 20, 2014

Related U.S. Application Data

(60) Provisional application No. 61/494,176, filed on Jun. 7, 2011.

(51) Int. Cl.
| | |
|---|---|
| *H01M 10/625* | (2014.01) |
| *H01M 10/6552* | (2014.01) |
| *H01M 10/643* | (2014.01) |
| *H01M 10/613* | (2014.01) |
| *H01M 10/659* | (2014.01) |
| *H01M 10/0525* | (2010.01) |

(52) U.S. Cl.
CPC ..... *H01M 10/5048* (2013.01); *H01M 10/613* (2015.04); *H01M 10/625* (2015.04); *H01M 10/643* (2015.04); *H01M 10/659* (2015.04); *H01M 10/6552* (2015.04); *H01M 10/0525* (2013.01)

(58) Field of Classification Search
CPC .................................................. H01M 10/50
See application file for complete search history.

(56) References Cited

U.S. PATENT DOCUMENTS

| | | | |
|---|---|---|---|
| 5,449,571 A * | 9/1995 | Longardner | ........ H01M 2/0237 429/120 |
| 6,468,689 B1 | 10/2002 | Al-Hallaj et al. | |
| 6,942,944 B2 | 9/2005 | Al-Hallaj et al. | |
| 7,505,269 B1 * | 3/2009 | Cosley | .......... F28D 15/02 165/104.33 |
| 2009/0004556 A1 * | 1/2009 | Al-Hallaj | .......... H01M 10/4207 429/120 |

(Continued)

*Primary Examiner* — Barbara L Gilliam
*Assistant Examiner* — Nathanael T Zemui
(74) *Attorney, Agent, or Firm* — Pauley Erickson & Kottis

(57) ABSTRACT

A thermal management method and system for energy storage devices, such as devices including an array of electrochemical cell elements. A first phase change material is in heat-transferring thermal contact with the electrochemical cell elements. A second phase change material in heat-transferring thermal contact with the first phase change material. A heat exchange path can be disposed between the first phase change material and the second phase change material.

19 Claims, 2 Drawing Sheets

(56) References Cited

U.S. PATENT DOCUMENTS

2009/0123815 A1    5/2009  Alkemade et al.
2009/0169983 A1    7/2009  Kumar et al.
2010/0273041 A1*  10/2010  Lawall ................ H01M 2/1072
                                                        429/120

* cited by examiner

ENERGY STORAGE THERMAL MANAGEMENT SYSTEM USING MULTI-TEMPERATURE PHASE CHANGE MATERIALS

CROSS REFERENCE TO RELATED APPLICATION

This application claims priority to or the benefit of U.S. Provisional Patent Application, Ser. No. 61/494,176, filed on 7 Jun. 2011. The provisional application is hereby incorporated by reference herein in its entirety and is made a part hereof, including but not limited to those portions which specifically appear hereinafter.

BACKGROUND OF THE INVENTION

This invention relates generally to battery power supply and, more particularly, to thermal management in such battery power supply systems. The word "battery" here is meant to include various forms of electrochemical power generation which have in common that chemical energy, in the form of one or more chemical reactants stored in a confined space, react with each other or with an external reactant in an electrochemical reaction, so as to produce electric power when desired.

Various uses of battery power supplies have been well established. For example, the packaging together of a plurality of cells in a parallel or series configuration to form a battery module or pack for use as a power supply for personal electronic devices such as cell phones, lap top computers, camcorders or the like have become well-known and common. In addition, desirable properties or characteristics of battery power supplies including, for example, the capability of certain battery power supplies to be recharged makes such battery power supplies an attractive potential power source for vehicle propulsion, i.e., electric vehicles (EV). Recently, the concept as well as the application of battery power have been extended to include "fuel batteries" or "fuel cell batteries", in which a fuel cell reaction is used to generate electric power in a manner somewhat similar to that of a conventional rechargeable battery, but in which one of the reactants (the fuel) must be replenished from time to time.

In various such applications, it is common that a number of cells are packed together in a preselected configuration (e.g., in parallel or in series) to form a battery module. A number of such battery modules may, in turn, be combined or joined to form various battery packs such as are known in the art. During operation and discharge, such cells, battery modules, or battery packs commonly produce or generate quantities of heat which can significantly detrimentally impact the performance that results therefrom. Thus, in order to maintain desired or optimal performance by such cells or resulting battery modules or battery packs, it is generally important to maintain the temperature of such cells, battery modules or battery packs within fairly narrow prescribed ranges.

In practice, temperature variations between individual cells can result from one or more of a variety of different factors including, for example:

1) changes in ambient temperature;
2) unequal impedance distribution among cells; and/or
3) differences in heat transfer efficiencies among cells.

Differences in heat transfer efficiencies among cells can typically be primarily attributed to the cell pack configuration. For example, cell elements at the center of a module or cell pack configuration may tend to accumulate heat while those cell elements at the periphery of the module or cell pack configuration will generally tend to be more easily or freely cooled as a result of greater relative heat transfer to the surrounding environment. Further, such variation in heat transfer efficiencies may lead to further differences in impedance such as may serve to amplify capacity differences among the cells. Such capacity imbalances can cause or result in some cells being over-charged or over-discharged which in turn may result in premature failure of a specific cell element or of an associated cell pack or module. In particular, such failures may take the form of thermal runaway or accelerating capacity fading.

Thermal management systems based on the use of active cooling (e.g., such as based on forced circulation of air, liquid or other selected cooling medium) have been proposed for use in conjunction with such battery power supply systems. Specific forms or types of active cooling include: "internal active cooling" wherein a selected cooling medium is typically circulated internally within the battery module or pack and "external active cooling" wherein a selected cooling medium is typically circulated externally to the battery module. It will be appreciated, however, that the incorporation and use of internal active cooling regimes may introduce undesired weight and/or a level of complexity in either or both power supply design and operation and such as may hinder or prevent the more widespread use of such corresponding power supply systems.

Further, the required or desired size of a battery power supply is generally dependent on the specific application thereof. Thus, certain contemplated or envisioned applications for such power supplies, such as to power electric vehicles, for example, may necessitate the use of such power supplies which have or are of significantly larger physical dimensions than those presently commonly used or available. As will be appreciated by those skilled in the art, thermal management in power supply systems can become even more critical or significant as the size of such cell, battery module, or battery pack is increased.

U.S. Pat. Nos. 6,468,689 and 6,942,944 are directed to thermal management of battery systems. There is a continuing need for improved thermal management systems and structures for battery systems.

SUMMARY OF THE INVENTION

The present invention is directed to improving thermal management of energy storage components, and more particularly systems of energy storage components. The invention includes a method of using two phase change materials with different melting/solidification temperatures in combination to maintain energy storage elements at a desired temperature, with a heat exchange path existing between the two phase change materials and/or the phase change materials and the energy storage elements and/or the surrounding air. The invention further includes a system or device including two phase change materials with different melting/solidification temperatures in combination to maintain energy storage elements at a desired temperature, with a heat exchange path existing between the two phase change materials and/or the phase change materials and the energy storage elements and/or the surrounding air.

In one embodiment of this invention, the energy storage system includes two different phase change materials (e.g., each having a different phase change temperature) to improve efficiency of thermal energy removal. In one embodiment, the energy storage components (e.g., batteries, capacitors, etc) will be surrounded by one phase change material ("PCM") that has a higher melting temperature than a second PCM. The melting point of this first PCM will desirably be designed to be below the maximum allowable component temperature determined according to need by the system designers. The primary PCM will absorb heat generated by the energy storage components and will reject heat to the secondary PCM. The secondary PCM will have a melting temperature above the expected surrounding air temperature but below the primary PCM melting temperature. The enforced temperature gradient between the two PCMs will enhance heat transfer by allowing for heat conduction between the two PCMs rather than relying solely upon convection from the heat transfer fluid. The dual melting temperature approach also allows for heat flow from the secondary PCM to the primary PCM during transient periods in cold ambient conditions.

The thermal management systems of this invention can further include a heat exchanger in combination with, and desirably extending within or between, the first and/or second PCM. Air flowing through, over, or across the heat exchanger transfers heat from the first and/or second PCM to the air flow. The heat exchangers can be embodied as, without limitation, microchannels (FIG. 1) and/or heat pipes (FIG. 2).

The invention includes a thermal management system for an energy storage device including an array of electrochemical cell elements. A first phase change material is in thermal contact with the electrochemical cell elements, and a second phase change material in thermal contact with the first phase change material. A heat exchange path is disposed between the first phase change material and the second phase change material.

The invention further includes an energy storage device including a battery module with a plurality of electrochemical cell elements separated by void spaces. A first phase change material is disposed in the void spaces. The first phase change material is at least partially surrounding each of the cell elements and in thermal contact therewith. A second phase change material is in thermal contact with the first phase change material. The first phase change material is disposed between the array and the second phase change material, and the second phase change material has a different melting/solidification temperature than the first phase change material.

The invention still further includes an energy storage device including an electrochemical cell array of a plurality of electrochemical cell elements. A first thermal management matrix at least partially envelopes the electrochemical cell array and is in thermal contact with the array. The first thermal management matrix includes a first phase change material. A second thermal management matrix is disposed adjacent to the first thermal management matrix and includes a second phase change material. The second phase change material has a lower melting temperature than the first phase change material.

Other objects and advantages will be apparent to those skilled in the art from the following detailed description taken in conjunction with the appended claims and drawings.

DETAILED DESCRIPTION OF THE INVENTION

U.S. Pat. Nos. 6,468,689 and 6,942,944, herein incorporated by reference, are directed to thermal management of battery systems. Aspects and advantages of this invention can be applied to battery systems such as disclosed in these Patents. Likewise, materials and features disclosed in these Patents can be incorporated in the systems according to this invention.

The present invention generally provides an improved power supply system and method of operation. More particularly, the invention provides an improved power supply system and method of operation such that provide or result in improved thermal management such as wherein undesired temperature excursions and non-uniformity of temperature can be appropriately reduced, minimized, or otherwise suitably managed.

Figure 1:
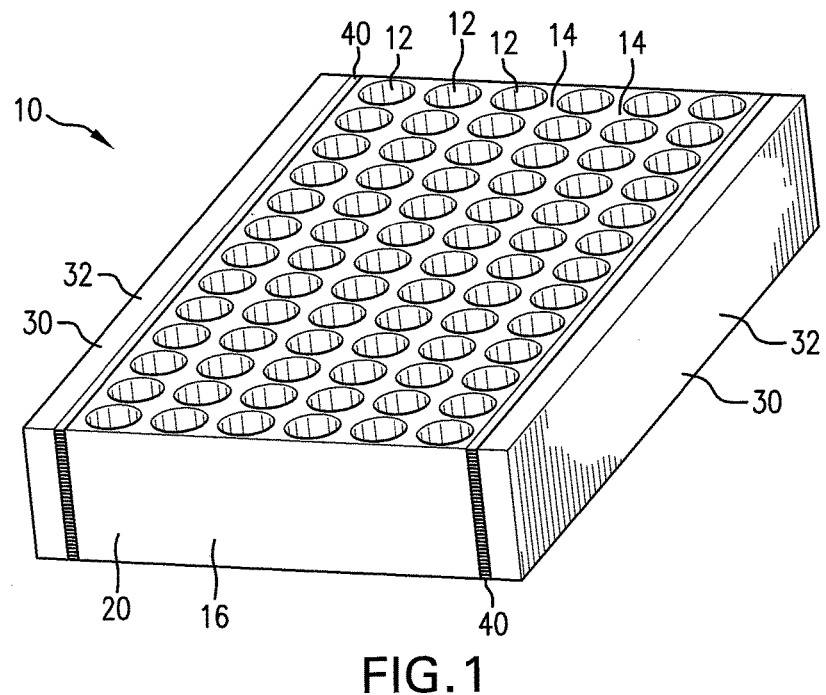
FIG. 1 is a perspective view schematic of a battery module incorporating a thermal management system in accordance with one embodiment of the invention

The present invention may be embodied in a variety of different structures. FIG. 1 illustrates the present invention as embodied in a battery module, generally designated by the reference numeral 10. The battery module 10 includes a cell package composed of a plurality of cell elements 12. The battery module 10 forms or includes void spaces, generally designated by the reference numeral 14, between the various adjacent cell elements 12.

In accordance with a preferred practice of the invention, such battery module voids are filled with or otherwise appropriately contain a suitable phase change material, generally designated by the reference numeral 16 and such as described in greater detail below, such as to facilitate desired thermal management within such a power supply system. In particular, in the illustrated embodiment, the phase change material 16 surrounds each of the cell elements 12, and is in general thermal contact therewith.

In accordance with one preferred embodiment of the invention, the included or incorporated phase change material 16 can desirably serve or act as a heat sink to absorb excess heat generated within the module 10 such as during the relatively highly exothermic process of battery discharge or charge. In particular, the heat generated from the cells 12 during discharge can be stored, at least temporarily in the phase change material 16 as latent heat.

Thus, the phase change material 16 permits the storage of such heat for later or subsequent use or utilization. For example, the heat stored or otherwise contained within such phase change material can later be appropriately released or, as commonly referred to, "rejected" for appropriate use in or in conjunction with the battery module 10. In particular, such stored heat can be appropriately rejected to the cell module during relaxation and keep the cells at an elevated temperature above the surrounding temperature for an extended period of time. For example, such heat can be later rejected such as when the battery temperature drops such as during battery charge or under cold weather conditions.

Various phase change materials, such as are known in the art, can suitably be used in the practice of the invention. For example, suitable phase change materials for use in Li-ion battery applications desirably will have a melting point in the range of between about 30° C. and 60° C., a high latent heat per unit mass ratio, and a narrow melting temperature range. Further, phase change materials for use in the practice of the invention will also desirably be thermally cyclable, non-hazardous, non-contaminant, non-reactive or otherwise inert with respect to other battery components, nontoxic, cheap, and of relatively light weight or density. Thus, suitable phase change materials may generally include paraffin waxes such as are relatively inexpensive, not prone to decomposition, and which generally have a relatively low melting temperature within the recommended range of operation for Li-ion cells.

Alternatively, those skilled in the art and guided by the teachings herein provided will appreciate that chlorobenzene and bromobenzene crystallize with very similar structure and have a low and narrow temperature range of crystallization. Thus, mixtures of chlorobenzene and bromobenzene may be suitable for particular applications such as involving precise temperature control between about 30° C. to about 45° C., for example.

Other possible or suitable phase change materials for such applications may include stearic acid which has a melting point of about 70° C., and various commercially available esters of stearic acid with methyl, propyl, and butyl alcohols, having melting points in the range of about 17° C. to about 34° C. Another candidate phase change material for use in the practice of the invention is polyethylene glycol (PEG). Potential or possible problems or concerns with thermal degradation by or of PEG may, however, prevent, limit or otherwise restrict such use or application. In view of the above, it is to be understood that the broader practice of the invention is not necessarily limited or restricted to the use of or the practice in conjunction with specific or particular phase change materials.

In accordance with a preferred practice of this embodiment of the invention, as shown in FIG. 1, the phase change material 16 is contained within a heat-conductive containment lattice member 20 such as desirably fills or is otherwise appropriately contained or positioned within the battery module voids between cell elements 12. The containment lattice member 20 desirably includes a plurality of openings or pores, the use of which will be described in greater detail below. The containment lattice member 20 is desirably formed of a heat-conductive material such as of metal, graphite or a composite thereof, for example. Particular preferred containment lattice member materials for use in the practice of the invention include, for example, various screen and foam materials such as graphite foam and metal foams such as aluminum foam and particularly open-celled forms of such foams, for example. Discrete heat conducting materials may be dispersed or distributed throughout the lattice to provide localized heat transfer enhancement. Combinations thereof may be used to achieve specific values and directionality in thermal conductivity.

As identified above, the containment lattice member 20 desirably includes a plurality of openings or pores. In accordance with a preferred practice of the invention, at least a portion of the phase change material supply 16 is disposed in the openings of the containment lattice member 20.

As will be appreciated by those skilled in the art and guided by the teachings herein provided, such battery module inclusion of a containment lattice member in accordance with the invention can desirably serve to more uniformly distribute heat generated upon a charge or discharge of electric power from the electrochemical cell elements as compared to an otherwise identical battery module without the containment lattice member. In accordance with a preferred embodiment of the invention, the containment lattice member has a thermal conductivity which is an order of magnitude greater than the thermal conductivity of the phase change material. In one particular preferred embodiment it has been found desirable that the containment lattice member have a thermal conductivity of at least about 10 W·m$^{-1}$K$^{-1}$.

The battery module 10 further includes a second phase change material 30 adjacent to the containment lattice member 20 having phase change material 16. In one embodiment, the phase change material 16 has a higher melting temperature than the second phase change material 30. The melting point of the "first" phase change material 16 is desirably designed to be below the maximum allowable component temperature determined according to need by the system designers. The first phase change material 16 will absorb heat generated by the cells 12 and will reject heat to the second phase change material 30. The second phase change material 30 will have a melting temperature above the expected surrounding air temperature but below the first phase change material 16 melting temperature. The dual melting temperature approach also allows for heat flow from the second phase change material 30 to the first phase change material 16 during transient periods in cold ambient conditions.

In the embodiment of FIG. 1, the second phase change material 30 is contained within a second containment lattice member 32. The second containment lattice member 32 can be the same or different than the containment lattice structure 20 discussed above. The second containment lattice structure 32 is shown in FIG. 1 as being adjacent to opposing sides of the containment lattice structure 20. As will be appreciated by those skilled in the art following the teachings herein provided, various and alternative sizes, shapes, amounts, and configurations of the battery module, the cells, and the two PCM containment lattice structures are available for use according to this invention, depending on need.

The thermal management systems of this invention can further include a heat exchanger in combination with, and desirably extending within or between, the first and second phase change materials. Air flows through, over, or across the heat exchanger to transfer heat from the first and/or second phase change materials to the air flow. In the embodiment of FIG. 1, the air flows through microchannels 40 disposed between the first and second phase change materials 16 and 30. Various and alternative sizes, shapes, and configurations are available for the microchannels. In one embodiment, for example, the microchannels extend in a linear path and are formed between walls of a relatively light weight formable heat conducting metal such as aluminum, copper, or the like. The fin-like walls of the microchannels 40 increase surface area to remove heat from the phase change materials, and particularly the second phase change material 30.

Figure 2:
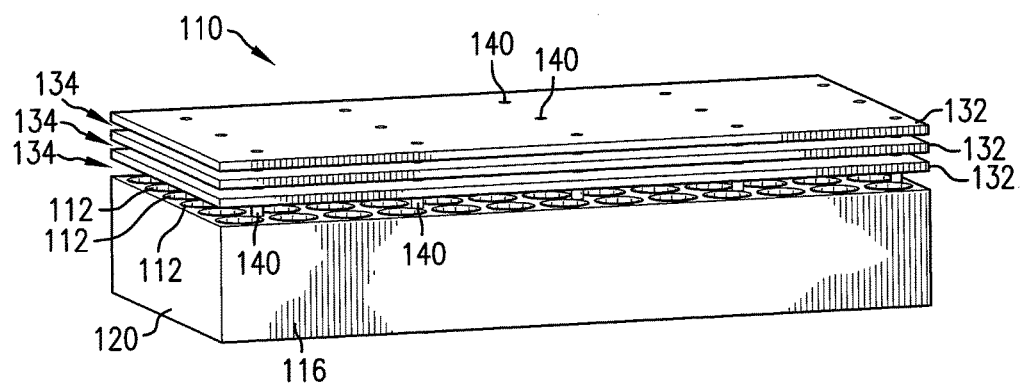
FIG. 2 is a perspective view schematic of a battery module incorporating a thermal management system in accordance with another embodiment of the invention.
Figure 3:
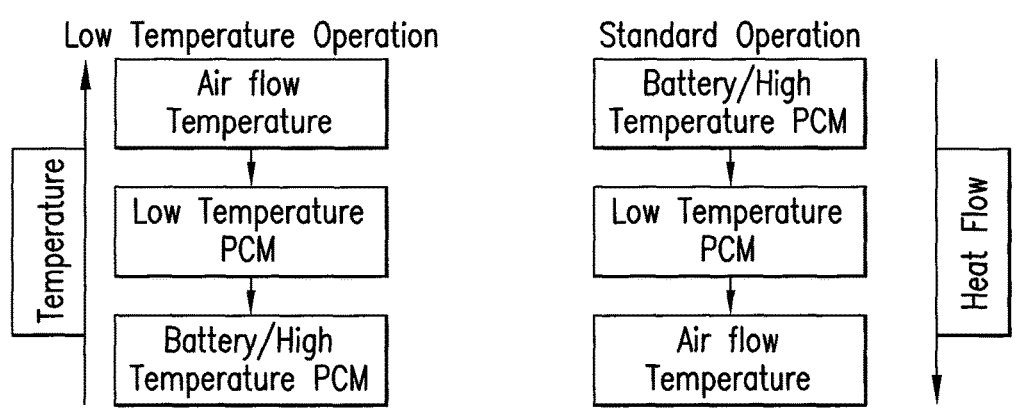
FIG. 3 illustrates heat flow between two PCMs in accordance with one embodiment of this invention.

FIG. 2 illustrates a battery module incorporating a thermal management system according to another embodiment of this invention, generally designated by the reference numeral 110. The battery module 110 includes a cell package composed of a plurality of cell elements 112. The battery module 110 includes a containment lattice structure 120 surrounding the cell elements 112, and including void spaces containing a first phase change material 116 between the various adjacent cell elements 112. A plurality of further containment lattice structures 132, each having a phase change material and/or providing a phase change temperature that is different from the first containment lattice structure 120, are disposed above the first containment lattice structure 120. An air flow space 134 is disposed between each adjacent lattice structure. The air flow spaces 134 can optionally include microchannels as discussed above, but are shown in FIG. 2 without microchannels and being in heat transfer combination with a plurality of heat pipes 140 as the heat exchanger.

The heat pipes 140 extend perpendicularly through the multiple layers of containment lattice structures and the air flow spaces. The heat pipes 140 are sealed hollow pipes that contain a liquid, such as water or aqueous coolant. The liquid in the heat pipes 140 evaporates due to heat from the first containment lattice structure 120. The gas evaporate rises, thereby removing heat energy from the first containment lattice structure 120 to the air flow spaces 140 and the second containment lattice structures 132.

The thermal management systems of this invention can also include a plurality of protruding heat transfer fins. More particularly, such heat transfer fins outwardly-extend from the housing battery module. Such heat transfer fins can typically be constructed or formed of a relatively light weight formable heat conducting metal such as aluminum, copper, or the like. As will be appreciated, however, such heat transfer fins can be variously formed or constructed such as suitably joined or connected to the housing or, as may be preferred, suitably joined or attached to the containment lattice member such as to be in thermal communication therewith. As will be appreciated by those skilled in the art and guided by the teachings herein provided, various forms or constructions of heat transfer fins can be utilized or incorporated in the practice of the invention, and the broader practice of the invention is not necessarily limited to use of or practice with particular forms or types of heat transfer fins.

As will be appreciated by those skilled in the art and guided by the teachings herein provided, the presence or inclusion of air flow spaces, microchannels, or heat transfer fins or the like facilitate the utilization of external active cooling wherein a selected cooling medium (e.g., such as based on forced circulation of air, liquid or other selected cooling medium) is circulated externally to the battery module such as via a fan (not shown), for example.

While the broader practice of the invention is not necessarily limited to the use of or practice with containment lattice members which contain or include a certain porosity, it has been found to be generally preferred that containment lattice members employed in the practice of the invention desirably contain or include a porosity or open volume of at least 20%. As will be appreciated, higher porosities permit or allow for higher loading of the phase change material therein.

It has been found generally desirable to dispose a quantity of an electric insulator about each of the cell elements to minimize or avoid undesired electrical contact by and between the electrochemical cell elements and the containment lattice member. Various insulator materials, such as various plastics, such as known in the art can be employed in the practice of the invention. It is to be understood that the broader practice of the invention is not necessarily limited to the use or practice with particular insulator materials.

While embodiments of the invention has been described making specific reference to battery cells, such as Li-ion cells, it is to be understood that various suitable cell elements can be used in the practice of such embodiments including rechargeable cell elements and fuel cell batteries such as utilize or employ hydrogen or methanol as a fuel, for example.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An energy storage device, comprising:
   an array of electrochemical cell elements;
   a containment lattice member surrounding the electrochemical cell elements and including void spaces between and around the electrochemical cell elements, the void spaces containing a first phase change material in thermal contact with the electrochemical cell elements;
   a second containment lattice member adjacent to the containment lattice member, and including further void spaces containing a second phase change material in thermal contact with the first phase change material;
   an air flow space separating the containment lattice member and the second containment lattice member, thereby also separating the first phase change material and the second phase change material; and
   a heat exchanger disposed in the air flow space and connecting the first phase change material and the second phase change material, wherein the heat exchanger provides the thermal contact, and the air flow space is open at two ends to receive an air flow over or through the heat exchanger.

2. The energy storage device of claim 1, wherein the first phase change material is disposed between the array and the second phase change material.

3. The energy storage device of claim 1, wherein the second phase change material has a different phase change temperature than the first phase change material.

4. The energy storage device of claim 1, wherein a first melting point of the first phase change material is lower than a predetermined maximum allowable temperature of the array, and a second melting point of the second phase change material is lower than the first melting temperature.

5. The energy storage device of claim 4, wherein the second melting point of the second phase change material is above an expected surrounding air temperature.

6. The energy storage device of claim 1, wherein each of the two ends of the air flow space is coextensive with a lattice end of each of the containment lattice member and the second containment lattice member.

7. The energy storage device of claim 1, further comprising a plurality of microchannels extending between and contacting each of the first containment lattice member and the second containment lattice member.

8. The energy storage device of claim 1, further comprising a plurality of further containment lattice structures, each spaced apart from an adjacent one of the further containment lattice structures and including a further phase change material that is different from the first phase change material.

9. The energy storage device of claim 8, further comprising a plurality of heat pipes each extending perpendicularly through and between the first containment lattice structure and the plurality of further containment lattice structures.

10. The energy storage device of claim 1, wherein the heat exchanger comprises a plurality of spaced apart heat conducting metal elements extending from the first phase change material to the second phase change material across the air flow space.

11. The energy storage device of claim 10, further comprising microchannels in the air flow space extending between the two ends.

12. The energy storage device of claim 10, further comprising sealed hollow pipes that contain a liquid extending through the first phase change material, the second phase change material, and the air flow space.

13. An energy storage device, comprising:
a battery module array including a plurality of electrochemical cell elements separated by void spaces;
a first phase change material disposed in the void spaces, the first phase change material at least partially surrounding each of the cell elements and in thermal contact therewith;
a second phase change material in a matrix spaced apart from and in thermal contact with one side of the battery module array and the first phase change material, wherein the second phase change material has a different melting/solidification temperature than the first phase change material; and
a heat exchanger including a plurality of metal microchannels or heat pipes extending between and connecting the battery module array and the first phase change material to the matrix of the second phase change material to provide the thermal contact, wherein the heat exchanger comprises an air flow space between the first phase change material and the second phase change material and between the metal microchannels or heat pipes, wherein a dimension of the matrix is coextensive with at least a length or width of the battery module array, and the air flow space has opposing open ends each aligned with one of two opposing ends of the length or width of the battery module array, and between the battery module array and the matrix, to receive an air flow over or through the heat exchanger.

14. The energy storage device of claim 13, wherein a first melting/solidification temperature of the first phase change material is below a predetermined maximum allowable temperature of the battery module array, and a second melting/solidification temperature of the second phase change material is below the first melting/solidification temperature.

15. The energy storage device of claim 13, wherein the heat exchanger comprises a plurality of metal microchannels open at each of the two ends.

16. The energy storage device of claim 15, wherein the air flow space extends between the two ends and around or through the plurality of metal microchannels.

17. An energy storage device, comprising:
an electrochemical cell array comprising a plurality of electrochemical cell elements;
a first thermal management matrix at least partially enveloping the electrochemical cell array and in thermal contact therewith, the first thermal management matrix including a first phase change material;
a second thermal management matrix disposed adjacent to the first thermal management matrix and including a second phase change material, the second phase change material having a lower melting temperature than the first phase change material;
a first air flow space separating the first thermal management matrix and the second thermal management matrix;
a third thermal management matrix disposed adjacent to the second thermal management matrix and including a third phase change material, the third phase change material having a lower melting temperature than the first phase change material;
a second air flow space separating the second thermal management matrix and the third thermal management matrix; and
a heat exchanger extending between and connecting the first thermal management matrix, the second thermal management matrix, and the third thermal management matrix, the heat exchanger comprising a plurality of heat pipes, wherein each heat pipe extends perpendicularly through the first thermal management matrix, the first air flow space, the second thermal management matrix, the second air flow space, and the third thermal management matrix.

18. The energy storage device of claim 17, wherein the first thermal management matrix comprises a plurality of openings in which at least a portion of the phase change material is disposed.

19. The energy storage device of claim 17, wherein each of the first and second air flow spaces is open to surrounding air at or adjacent two opposing ends of the second thermal management matrix and the surrounding air enters the first and second air flow spaces and flows over or through the heat exchanger.

* * * * *